(12) United States Patent
Bilanin et al.

(10) Patent No.: US 10,755,824 B2
(45) Date of Patent: Aug. 25, 2020

(54) NUCLEAR REACTOR USING CONTROLLED DEBRIS TO MITIGATE ECCS STRAINER PRESSURE HEAD LOSS

(71) Applicant: Continuum Dynamics, Inc., Ewing, NJ (US)

(72) Inventors: Alan J. Bilanin, Princeton, NJ (US); Andrew E. Kaufman, New Hope, PA (US); Raymond Tiberge, Yardley, PA (US)

(73) Assignee: Continuum Dynamics, Inc., Ewing, NJ (US)

( * ) Notice: Subject to any disclaimer, the term of this patent is extended or adjusted under 35 U.S.C. 154(b) by 0 days.

(21) Appl. No.: 16/330,078

(22) PCT Filed: Nov. 20, 2017

(86) PCT No.: PCT/US2017/062471
§ 371 (c)(1),
(2) Date: Mar. 2, 2019

(87) PCT Pub. No.: WO2018/058152
PCT Pub. Date: Mar. 29, 2018

(65) Prior Publication Data
US 2019/0221323 A1 Jul. 18, 2019

Related U.S. Application Data

(60) Provisional application No. 62/495,636, filed on Sep. 20, 2016.

(51) Int. Cl.
*B01D 29/00* (2006.01)
*G21C 19/307* (2006.01)
(Continued)

(52) U.S. Cl.
CPC ........... *G21C 19/307* (2013.01); *B01D 29/00* (2013.01); *B01D 29/01* (2013.01); *G21C 1/084* (2013.01);
(Continued)

(58) Field of Classification Search
CPC .... G21C 19/307; G21C 1/084; G21C 15/182; G21C 9/016; B01D 29/00; B01D 29/01;
(Continued)

(56) References Cited

U.S. PATENT DOCUMENTS 4,645,641 A * 2/1987 Nicolai .................. G21C 9/008
376/281
4,971,752 A * 11/1990 Parker ...................... G21C 9/02
376/272

(Continued)

FOREIGN PATENT DOCUMENTS

CA 2000983 4/1991
EP 0428747 A1 * 5/1991 ............. B01D 24/28

OTHER PUBLICATIONS

Bilanin, A.J., et al., "Recapturing Net Positive Suction Head Margins in Boiling Water Reactor Emergency Core Cooling Systems," Proceedings of the ASME 2017 Pressure Vessels & Piping Conference, Jul. 16-20, 2017, Waikoloa, HI.

(Continued)

*Primary Examiner* — Lily C Garner
(74) *Attorney, Agent, or Firm* — David M. Quinlan, P.C.

(57) ABSTRACT

Controlled-debris elements inhibit the formation of a fibrous/particulate debris bed that unduly increases the pressure head loss through the perforated plates of strainers in a nuclear power plant emergency core cooling system. In a loss of cooling accident, pumps draw cooling water through the plates, which retain on their surfaces fibrous material in the circulating water to prevent it from reaching the pumps (Continued)

while permitting entrained particulate matter to pass through the perforations. The controlled-debris elements have a specific gravity substantially the same as the circulating water so they are entrained in the cooling water that is drawn toward the strainers and intimately intermix with the fibrous and particulate matter in the cooling water. The elements are configured to provide open structures in the bed formed on the plate surfaces to distribute fibers in the flow away from the surface and maintain cavities between the elements for the particulates.

26 Claims, 6 Drawing Sheets

(51) Int. Cl.
| | | |
|---|---|---|
| *B01D 29/01* | (2006.01) | |
| *G21C 1/08* | (2006.01) | |
| *G21C 15/18* | (2006.01) | |
| *B01D 24/00* | (2006.01) | |
| *B01D 24/28* | (2006.01) | |
| *B01D 24/20* | (2006.01) | |
| *E02B 3/02* | (2006.01) | |
| *B01D 33/00* | (2006.01) | |
| *G21C 9/016* | (2006.01) | |
| *B01D 24/46* | (2006.01) | |
| *E02B 5/08* | (2006.01) | |
| *B01D 24/42* | (2006.01) | |
| *B01D 24/40* | (2006.01) | |

(52) U.S. Cl.
CPC ............ *G21C 15/182* (2013.01); *B01D 23/00* (2013.01); *B01D 23/10* (2013.01); *B01D 24/00* (2013.01); *B01D 24/20* (2013.01); *B01D 24/28* (2013.01); *B01D 24/402* (2013.01); *B01D 24/425* (2013.01); *B01D 24/4668* (2013.01); *B01D 33/0035* (2013.01); *B01D 2101/00* (2013.01); *E02B 3/02* (2013.01); *E02B 5/085* (2013.01); *G21C 9/016* (2013.01)

(58) Field of Classification Search
CPC .... B01D 2101/00; B01D 23/00; B01D 23/10; B01D 24/00; B01D 24/20; B01D 24/28; B01D 24/402; B01D 24/425; B01D 24/4668; B01D 33/0035; E02B 3/02; E02B 5/085
See application file for complete search history.

(56) References Cited

U.S. PATENT DOCUMENTS

| | | | |
|---|---|---|---|
| 5,759,399 A * | 6/1998 | Bilanin | ................ B01D 29/111 210/416.1 |
| 5,835,549 A | 11/1998 | Sibiga | |
| 5,945,005 A | 8/1999 | Junius et al. | |
| 7,211,190 B2 | 5/2007 | Kielbowicz | |
| 7,848,475 B2 * | 12/2010 | Kaufman | ............... B01D 39/10 210/346 |
| 8,054,932 B2 | 11/2011 | Smith et al. | |
| 8,663,469 B2 | 3/2014 | Kim et al. | |
| 8,877,054 B2 * | 11/2014 | Andersen | ............ B01D 35/303 210/232 |
| 9,738,440 B2 | 8/2017 | Loewen et al. | |
| 9,881,705 B2 * | 1/2018 | Lin-Hendel | ............... A62C 3/00 |
| 2006/0219645 A1 * | 10/2006 | Bilanin | ................ B01D 29/01 210/791 |
| 2008/0223779 A1 | 9/2008 | Kaufman et al. | |
| 2012/0211430 A1 | 8/2012 | Choi | |
| 2013/0208847 A1 * | 8/2013 | Prather | ............... G21C 19/307 376/309 |
| 2014/0197091 A1 | 7/2014 | Andersen et al. | |
| 2015/0260330 A1 | 9/2015 | Tortorello | |
| 2016/0329114 A1 * | 11/2016 | Lin-Hendel | ............ G21C 9/004 |
| 2018/0296947 A1 * | 10/2018 | Jackson | ................... B01J 19/30 |

OTHER PUBLICATIONS

International Search Report and Written Opinion, PCT/US2017/062471, dated Feb. 2, 2018.

* cited by examiner

NUCLEAR REACTOR USING CONTROLLED DEBRIS TO MITIGATE ECCS STRAINER PRESSURE HEAD LOSS

CROSS-REFERENCE TO RELATED APPLICATIONS

This application claims benefit of U.S. provisional application No. 62/495,636, filed Sep. 20, 2016, the entire contents of which are incorporated by reference as if set out in full herein.

BACKGROUND OF THE INVENTION

Field of the Invention

The present invention relates to mitigating pressure head loss across a strainer used to remove entrained solids from a liquid, and more particularly, to controlled-debris elements for mitigating head loss across a nuclear power plant suction strainer that removes material from cooling water circulated by the emergency core cooling system pumps during a loss of cooling accident.

Description of Related Art

Nuclear power plants are required by law to have an emergency core cooling system (ECCS) that circulates cooling water to critical reactor areas in a so-called loss of cooling accident (LOCA). In a LOCA event the plant's ECCS pumps continuously circulate cooling water from a reservoir, through the reactor core to reduce its temperature, and back to the reservoir. Regulations stipulate that a power plant be designed to prevent overheating of the reactor core in the event of the worst-case LOCA known as a "guillotine break."

During a LOCA event, a boiling water reactor (BWR) commonly draws cooling water from one or more reservoirs, known as suppression pools, in the reactor containment area. The violent expulsion of high-pressure water or steam caused by a LOCA typically destroys various reactor components, which creates large quantities of debris such as fibrous fragments of thermal insulation, pieces of concrete, small paint chips, rust particles, and other fibrous and particulate matter from various sources in the containment area. The blow-down or depressurization of the reactor vessel resulting from a LOCA transports this debris to the BWR suppression pool. The cooling water pumped from the suppression pool by the ECCS pumps carries this debris toward suction strainers designed to remove debris that could damage the pumps. A typical pressurized water reactor (PWR) has a normally dry containment area that receives the debris resulting from a LOCA. At the same time, cooling water is drawn into the normally dry containment area from a reactor water storage tank (RWST), and is then recirculated through the reactor. The ECCS pumps draw the cooling water from the reservoir formed in the containment area sump in the same fashion as a BWR. The PWR cooling water thus will contain the same types of entrained solid debris encountered in a BWR accident. That is, in both types of reactors, cooling water is continuously drawn from a reservoir by ECCS pumps, passed through the reactor pressure vessel, and returned to a reservoir at the bottom of the containment area.

Strainers are used to remove entrained debris from the cooling water before the water passes through the ECCS pumps and prevents the debris from damaging the pumps and compromising the ability of the ECCS to cool the reactor core. The strainers are located in the reservoir upstream of each ECCS pump to remove debris from the cooling water carried toward the strainers as the pumps draw the water from the reservoir. These strainers must be able to remove solid debris large enough to foul or damage the pumps or the nuclear fuel, without unduly retarding the flow of cooling water to the pumps and thus to the reactor core.

There has been considerable effort expended on the design of strainers to decrease pressure head loss across the strainer that occurs as the large amounts of debris released by a LOCA accumulates on the strainer surfaces. A popular strainer design has multiple perforated strainer elements disposed in various configurations relative to one another with the object of increasing the total surface area over which the material strained from the cooling water is distributed. These strainers typically include a central core to which the suction side of an ECCS pump is attached to draw cooling water through the perforated strainer elements and prevent debris larger than the perforations from reaching the pumps. The prior art describes myriad configurations of suction strainers with multiple strainer elements arranged in various configurations relative to each other and to a central core, examples being U.S. Pat. No. 5,759,399 (assigned to the assignee of the present invention), U.S. Pat. Nos. 7,211,190, 7,848,475 (also assigned to the assignee of the present invention), and U.S. Pat. No. 8,663,469, and Pub. No. US 2013/0208847, all of which are incorporated by reference as if set out in full herein.

Small amounts of fiber per se are not normally problematic when transported to a suction strainer by the cooling water, but they become a concern when combined with entrained particulates. As the fiber accumulates on the strainer, particulates begin to accumulate in the passages between individual fibers and the strainer begins to filter the particulate matter out of the flow instead of allowing it to pass though the perforations. The resulting filter bed on the strainer surfaces can quickly block the flow of the particulates through the strainer. One way to combat this filter effect is to make the strainer larger, thereby distributing the debris over more area to lessen the thickness of the filter bed on each strainer surface. However, this is an imperfect solution, both because the available space for suction strainers in a reactor containment area is limited, and because larger strainers are more costly. Accordingly, it is possible that the expected debris load after a LOCA would require strainers that are too large for the space available. Moreover, simply making the strainers larger or employing more strainers increases the cost of the strainers themselves and also adds to the cost of installing them.

U.S. Pat. No. 7,848,475 discloses a strainer in which the surfaces of the strainer elements are contoured in a way that disrupts the formation of a bed of fibrous material on the strainer elements so it will not trap as much particulate material. This strainer configuration, particularly the embodiment in which a wire mesh cloth provides the contoured surface, has been installed in several nuclear power plants. Nevertheless, it increases the cost to fabricate the strainer and is costly to retrofit wire mesh cloth on strainers that were not designed to incorporate it.

Pub. No. US 2013/0208847 discloses strainer structure intended to mitigate the formation on strainer surfaces of debris beds that reduce or prevent flow of cooling water to the ECCS pumps. One embodiment uses a plurality of mesh cubes captured in enclosures on the strainer upstream of primary strainer surfaces. The cubes are said to reduce the density of the debris bed that forms on them, but if the bed becomes too dense anyway, the cubes are meant to flex and deform to induce ruptures in the bed that will allow the flow to proceed to the primary strainer surfaces. In essence the cubes are simply a variation on the '475 patent's wire mesh cloth attached to the strainer surfaces to disrupt fibrous/particulate bed formation. The mesh cubes will also add significantly to the cost of the strainer, and the '847 publication does not provide any experimental evidence that the posited rupture of the fibrous/particulate bed formed on the cubes will permit sufficient flow through the strainer.

Fundamentally, both of these prior art approaches involve altering the strainer structure to mitigate the formation of flow-blocking fibrous/particulate beds that unduly increase pressure head loss across ECCS system strainers. While experimental data presented in the applicant's '475 patent supports the efficacy of design changes involving contouring the perforated strainer surfaces, the present disclosure uses an approach that does not rely on modifications to existing strainer configurations.

Another approach being adopted at some nuclear facilities replaces existing fibrous insulation with non-fibrous reflective metal insulation. However, manually replacing all fibrous insulation in a nuclear power plant is costly, labor-intensive, and requires stringent control of workers' exposure to radiation. Moreover, it is virtually impossible to remove all fibrous insulation because there are so many inaccessible locations within existing power plants where it is installed. And even if it were possible to eliminate all fibrous insulation from a power plant, some unknown amount of "latent" fiber can remain from miscellaneous sources such as shreds of ropes, clothing, tarps, and other materials inadvertently left behind after using them during normal plant maintenance.

SUMMARY OF THE INVENTION

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

It is an object of the present invention to mitigate the pressure head loss across a perforated-plate ECCS strainer during a LOCA event in a manner that does not require special strainer constructions.

In accordance with a first aspect of the invention, a plurality of controlled-debris elements are adapted to be disposed in a nuclear power plant having an ECCS strainer located in a reservoir of water from which water is drawn for circulation to the reactor in response to a loss of cooling accident (LOCA). The strainer includes at least one surface for retaining debris entrained in water in the reservoir flowing toward the strainer and has perforations through the surface for permitting the water to pass through the strainer during a LOCA. Each element has a specific gravity substantially the same as the circulating water during at least a portion of time following the LOCA onset for entraining the element in the flow of water in the reservoir toward the strainer, which deposits a layer of the elements intermixed with the debris. The elements are configured to form open spaces between adjacent elements in the debris/element layer, which tests show mitigates pressure head loss across the strainer.

In accordance with another aspect of the invention, an emergency core cooling system for circulating cooling water during a time period beginning near the onset of a power plant loss of cooling accident (LOCA) that expels fibrous and particulate debris into the cooling water. The system includes controlled-debris means for forming on the ECCS strainer surface a debris/element layer with open spaces as the cooling water is drawn toward the pressure side of the strainer by the ECCS pump. The controlled-debris means is constructed to be entrained with the fibrous and particulate material in the water drawn toward the strainer and form a debris/element layer with open spaces to permit passage of water through the layer of debris and the perforations. Tests confirm that such controlled-debris means inhibits the formation of a high head loss debris bed of fibers and particulate material entrained in the circulating cooling water.

The controlled-debris means can comprise elements of myriad shapes within the scope of the invention, including those specifically disclosed herein and others disclosed in provisional application No. 62/495,636, as well as equivalent constructions that perform the elements' function described herein.

Also disclosed are various ways of storing the controlled debris for deployment into the cooling water in the event of a LOCA. The elements can be stored in receptacles that break away at LOCA onset, or be disposed in the suppression pool of a BWR power plant or the dry sump of a PWR power plant during normal plant operations.

Other general and specific aspects, details, embodiments, and adaptations of controlled-debris elements and nuclear power plant design in furtherance of the objects of the subject matter covered herein are described below in the context of certain specific embodiments of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

FIG. 7, comprising

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF THE PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

In general, terms used throughout have the ordinary and customary meaning that would be ascribed to them by one of ordinary skill in the art. However, some of the terms used in the description herein will be explicitly defined and that definition is meant to apply throughout. For example, the term "substantially" is sometimes used to indicate a degree of similarity of one property or parameter to another. This means that the properties or parameters are sufficiently similar in value to achieve the purpose ascribed to them in the context of the description accompanying the use of the term. Exact equivalence of many properties or parameters discussed herein is not possible because of factors such as engineering tolerances and normal variations in operating conditions, but such deviations from an exact identity still fall within the meaning herein of being "substantially" the same. Likewise, omission of the term "substantially" when equating two such properties or parameters does not imply that they are identical unless the context suggests otherwise. Similar considerations apply to the term "about," which is sometimes used herein to indicate that the nominal value of a parameter can vary a certain amount as long as it produces the intended effect or result. Further, when elements are referred to as being "connected," the elements can be directly connected or coupled together or one or more intervening elements may also be present.

Power Plant Structure Relevant to the Present Invention

Figure 1:
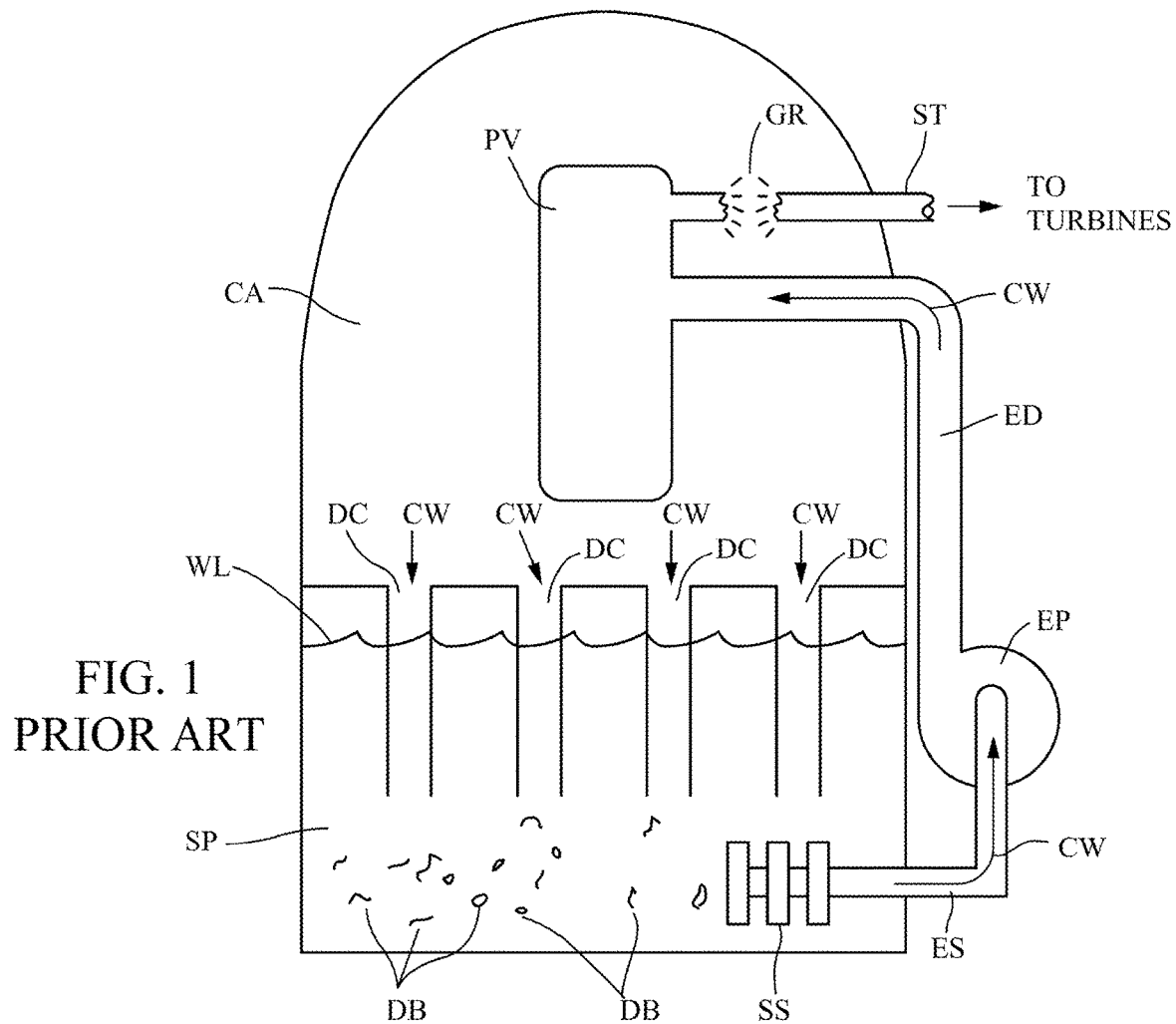
FIG. 1 is a schematic representation cross-section of a BWR containment area illustrating components relevant to the pressure loss mitigation approach described in the present disclosure.

FIG. 1 is a highly schematic representation of a BWR containment area CA having a pressure vessel PV that encloses a reactor core for generating the intense heat that creates steam introduced to generator turbines by steam pipes ST (only one of which is shown for simplicity of illustration). The lower portion of the containment area comprises a suppression pool SP that holds a reservoir of water (on the order of 1,000,000 gallons) for cooling the reactor core during a LOCA event. It will be understood that a PWR also has a reservoir of cooling water available during a LOCA, although a PWR containment area sump is typically dry during normal reactor operation and is flooded when a LOCA is detected. In both types of power plant a LOCA event such as a guillotine break GR (see above) causes violent discharge of high-pressure water or steam into the containment area and creates large quantities of fibrous and particulate debris as already described. The sudden release of water or steam is accompanied by a rapid increase in the temperature of the reactor core if its coolant is not replaced, which if unabated can reach levels that melt the reactor pressure vessel and release radioactive material into the environment (known as a meltdown).

Accordingly, nuclear power plants are required to include an ECCS system capable of circulating large quantities of cooling water from the cooling water reservoir to the reactor core to prevent it from reaching critical temperature. The ECCS system includes a plurality of ECCS pumps EP (only one of which is shown for simplicity of illustration) with a suction line ES connected to the suction core of a perforated-plate strainer SS immersed in the reservoir to draw cooling water CW into the pump EP and feed it through a discharge line ED to the reactor core. A BWR reactor as shown in FIG. 1 includes downcomers DC, which empty into the BWR suppression pool SP below the water level WL therein. The cooling water flows back to the suppression pool SP through the downcomers to be reintroduced to the reactor core by the pumps EP. All the while, more and more debris DB is accumulating on the strainer surfaces.

Figure 2:
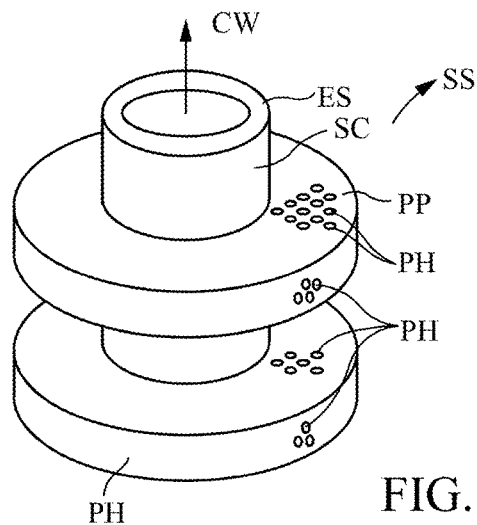
FIG. 2 is a schematic view of part of a generic perforated-plate ECCS strainer in the reactor containment area shown in FIG. 1.

FIG. 2 schematically illustrates a portion of the ECCS strainer SS shown in FIG. 1. The strainer depicted in FIG. 2 is a basic stacked-disc design in which a central suction core SC is surrounded by a series of spaced discs, each of which is formed by a pair of perforated plates PP enclosing a plenum that opens to the central core. The suction line ES of the pump EP is operatively connected to the suction core SC to draw cooling water CW through perforations PH for delivery to the reactor core.

Figure 3:
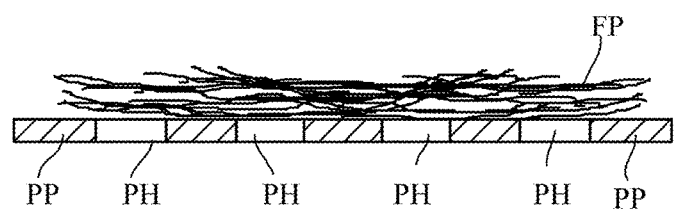
FIG. 3 is a notional representation of the fibrous bed that forms on a perforated plate of the ECCS strainer shown in FIG. 2 and can trap particulate matter transported in the cooling water flow during a LOCA event.

FIG. 3 is a notional representation of the fibrous/particulate bed that forms on the surfaces of the perforated plates PP. The fibrous phase FP of the debris sucked onto the surface of the perforated plate PP forms a layer that accumulates on the plate surface and thickens because of the release of fibrous insulation in the containment area caused by the LOCA event. As a result, particulates are filtered by fibrous material when sufficient fibers accumulate on the surface to render the interstitial spaces between the fibers smaller than the particulates. Once particulates start to become caught in the spaces between the fibers, the pressure drop across the fiber bed increases, further compressing the bed, which reduces the spaces between the fibers even more and hence captures more particulate. This filtration phenomenon can lead to very high head loss for an ECCS strainer over a wide range of fibrous to particulate ratios in the debris.

At this time, industry has undertaken a two-pronged approach to address these concerns. One is to conduct a very rigorous inspection of all power plant areas susceptible to damage from a LOCA and remove both fibrous materials and substances that may result in the generation of particulate matter when exposed to the high pressure discharge of steam or water. This seemingly straightforward approach actually involves significant expense and high exposure of workers to radiation. The second approach uses probabilistic risk assessment (PRA) to demonstrate that the severest LOCA to which the power plant must be designed (a "design-basis accident") will not significantly increase the probability of reactor core damage with current levels of fibrous and particulate debris. However, the plant owner must still satisfy the licensing requirement that the ECCS be able to cool the reactor core during a LOCA event. It is believed that no existing reactors are presently operating under an approved PRA.

Accordingly, there remains a need for a simpler approach to the filtration problem encountered with commonly used perforated-plate strainers, one that does not rely on special strainer structure, costly modifications to existing power plants, or rigorous and costly PRA studies that still do not eliminate the need for an ECCS system that is functional during a design-basis accident. Moreover, the solution presented herein can be used in combination with other approaches. For example, using the controlled-debris elements described herein may ease requirements concerning the extent to which the fibrous insulation must be removed, or facilitate approval of a PRA for a given plant.

Controlled Debris for Preventing Fibrous Filtration

The invention solves the filtration problem not by changing the strainer design, but by adding controlled-debris elements to the cooling water. The idea is to add specially designed debris that will be entrained in the cooling water flow and transported with the cooling water to the strainer. The efficacy of this approach is supported by the experiments described in detail further below. While the inventors do not wish to be bound by any particular theory as to why or how the controlled-debris elements described herein reduce head loss across perforated plates such as those used in prior art strainers, FIGS. 4 and 5 illustrate the mechanism that is believed to provide the advantageous results described herein.

Figure 4:
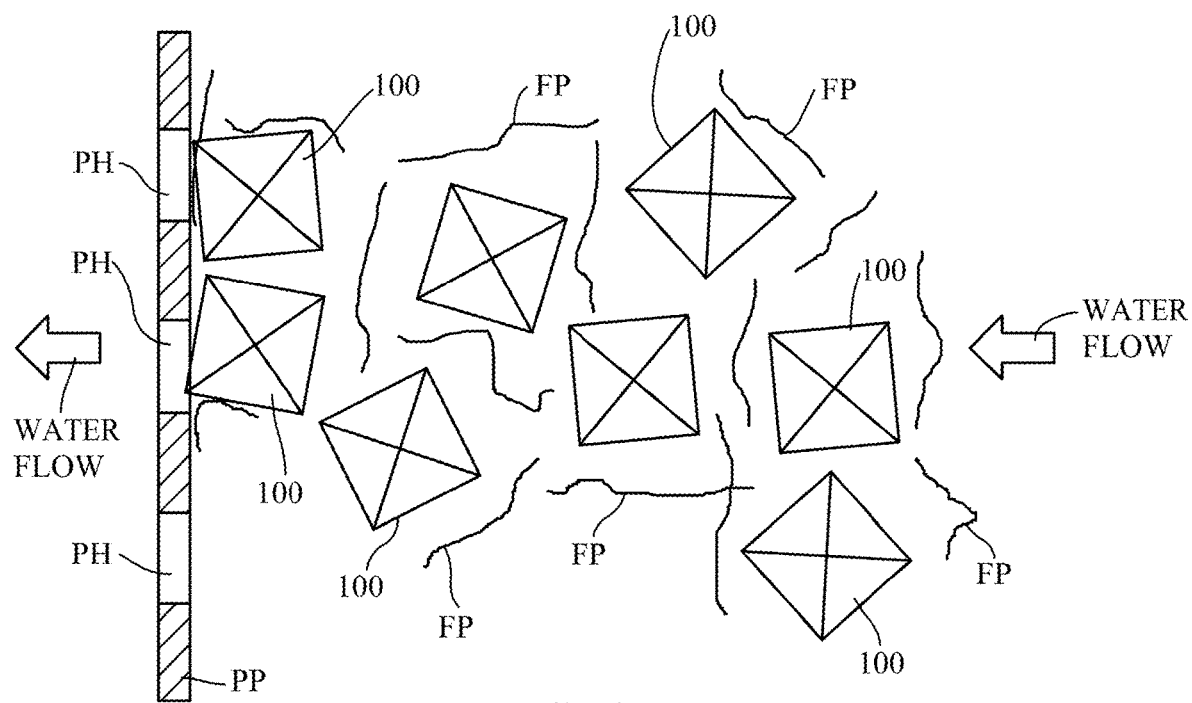
FIGS. 4 and 5 taken together depict one theory of the mechanism by which the controlled-debris elements described herein reduce head loss across nuclear power plant perforated-plate strainers.
Figure 5:
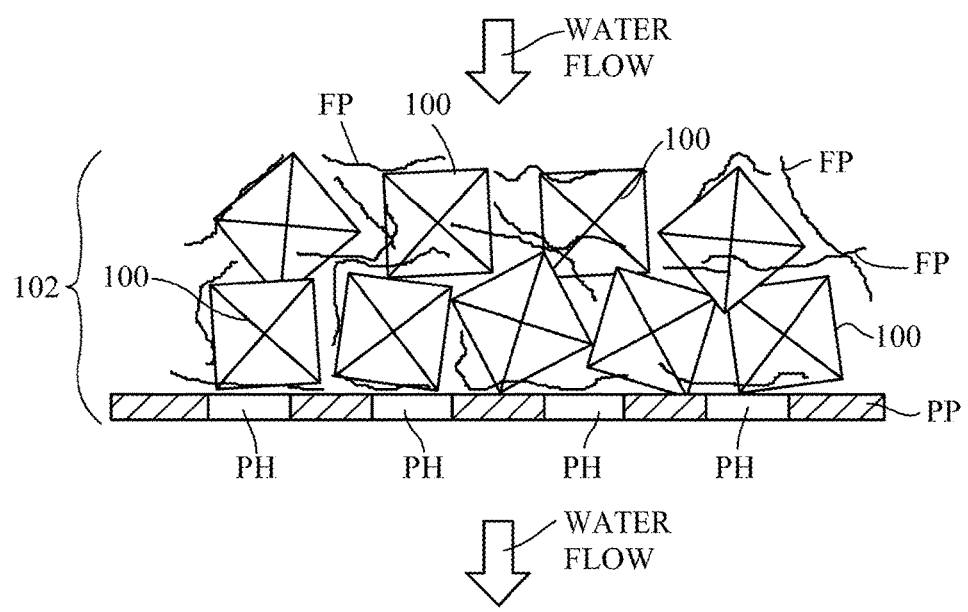

FIG. 4 is a notional depiction of water flow toward the strainer's perforated plates. The principal is that the present invention's controlled-debris elements 100 in the containment area reservoir have a specific gravity substantially the same as the cooling water flowing toward the strainer. In this way, the controlled-debris elements 100 are entrained in the cooling water with the fibrous debris and thus intimately intermixed with it so that fibers FP and controlled-debris elements 100 are deposited on the plate surface together over time. As a result, fibers and controlled debris are intermixed throughout the fiber/particulate/controlled-debris element bed 102 as shown in FIG. 5 as the bed 102 forms over time. (The particles are omitted from FIG. 5 for clarity of illustration.) It is believed that maintaining the fibrous debris and the elements 100 intermixed in the flowing water will prevent a significant number of the fibers from depositing directly on the surface of the plates PP.

A second salient feature of the controlled-debris elements 100 is that they are configured to form open structures on the strainer surface so that they distribute the fibers FP away from the surface and maintain cavities between each other. Particular shapes can be designed that will substantially prevent an element from coming to rest in surface-to-surface contact with the perforated plates and thus inhibit flow itself. FIG. 5 illustrates the elements 100 in this orientation, and shows how it distributes fibers away from the surface and assists in maintaining spaces between fibers in the bed 102. It is important to note this fundamental difference between the structure of the fiber/particulate/controlled-debris bed 102 that forms on the perforated plate as depicted in FIG. 5, and the dense fiber bed shown in FIG. 3 that will trap particulates.

It will be appreciated that this aspect of the invention differs fundamentally from prior art approaches, which sought to relieve the pressure head loss across the bed shown in FIG. 3 by changing the configuration of the surface on which the bed forms. In contrast, the approach described herein alters the structure of the bed itself, by introducing into the cooling water flow controlled-debris elements that comprise, in combination, a specific gravity that causes them to be entrained in the cooling water flow where they intermix with fibers resulting from a LOCA and a configuration that forms open structures on the strainer surfaces that maintains the fibers away from the surface as they accumulate on the surface with the controlled-debris elements.

Figure 6:
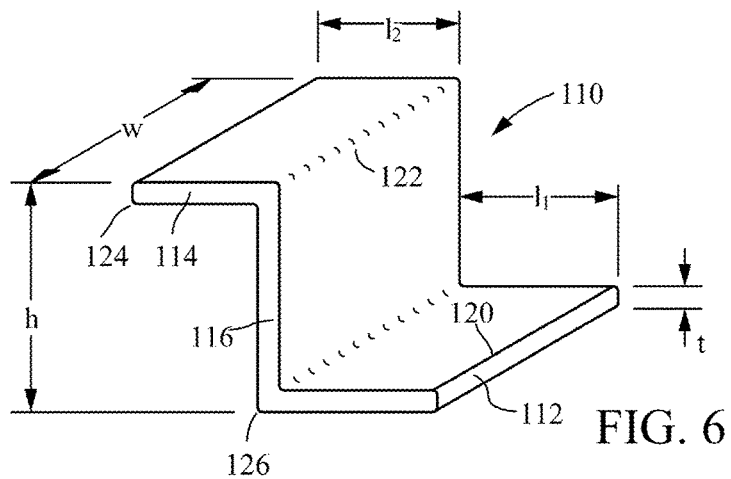
FIG. 6 illustrates a preferred embodiment of a controlled-debris element represented schematically in FIG. 5.

First Controlled-Debris Embodiment. FIG. 6 depicts a first preferred embodiment of a controlled-debris element 110 that has been tested to determine its capability to mitigate the formation of a fibrous filtration bed on a perforated surface under flow conditions simulating those that would be encountered by a strainer during a nuclear power plant LOCA. The element 110 is made of a plastic material that retains suitable mechanical and chemical resistance properties at temperatures encountered in a reactor containment area during a LOCA event. One preferred material for the element 110 is a high-density polyethylene (HDPE) polymer, which has a specific gravity similar to the cooling water and withstands the temperature and radiation environment. Provisional application No. 62/495,636 describes a test apparatus and test protocol that was used to confirm the efficacy of the controlled-debris element configuration shown in FIG. 6 for fibrous filtration bed mitigation. Further details concerning the test apparatus and the results of tests performed with it on various kinds of debris are discussed in connection with the working example set out below.

As shown in the drawing, the element 110 is in the general shape of the letter "Z" with a first leg 112, a second leg 114, and a connecting leg 116 integrally connecting the first and second legs to form a one-piece element. The first and second legs 112 and 114 are generally parallel to each other and the connecting leg 116 is mutually perpendicular to both. The exact dimensions of the element 102 depend on a number of factors relating to the environment of the particular power plant in which it will be used, such as the dimensions of the strainers and the characteristics of the debris expected to be produced. The size and shape of the controlled-debris elements in any given application can be determined empirically by tests such as those to be described herein. In the present embodiment, the length $l_1$ of the first leg 112 is about 15 mm, the length $l_2$ of the second leg 114 is about 15 mm, and the height h of the connecting leg is about 20 mm. The element is extruded in the one-piece Z-shape shown in FIG. 6 with a uniform thickness t of about 3 mm, and then cut into pieces yielding a width w of about 25 mm.

It can be seen from FIG. 6 that multiple elements with the configuration of the element 110 will automatically create open structures on the strainer surface because the elements will inherently orient randomly relative to each other as they are transported onto the strainer with the reactor cooling flow. The hydrodynamic forces on any one element will tend to force it to come to rest on the surface of the strainer plate in one of two predominant positions. In one an edge 120 of the first leg 112 and the corner 122 where the second leg 114 meets the connecting leg 116 will contact the plate surface, and in the other an edge 124 of the second leg 114 and the corner 126 where the first leg 112 meets the connecting leg 116 will contact the plate surface. The controlled-debris elements 110 will thus tend to stack randomly on strainer surfaces to form open passages that permit the flow of water and form myriad surfaces and sharp edges to capture fibers and other debris in the cooling water flow.

Figure 9:
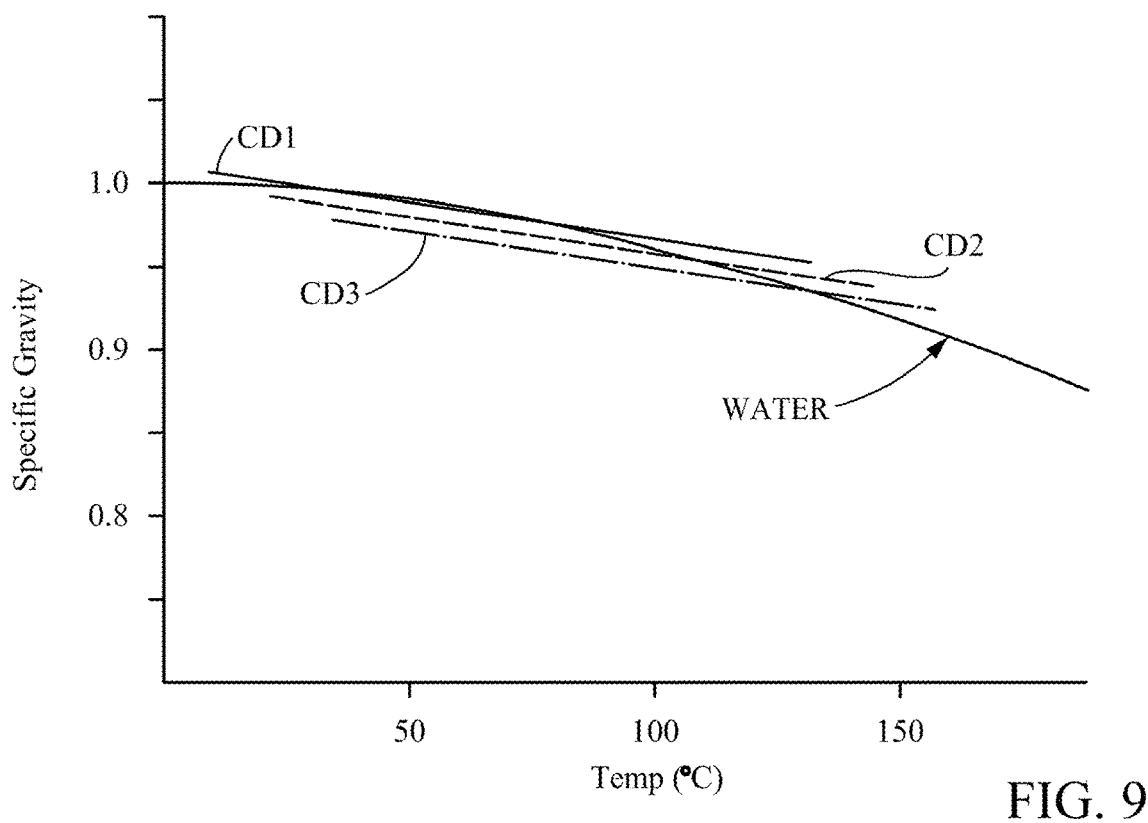
FIG. 9 is a graph of the specific gravities of water and multiple controlled-debris elements vs. temperature according to another embodiment of the invention.

Alternate Controlled-Debris Embodiments. Although FIG. 6 represents one preferred embodiment of a controlled-debris element, the elements can assume virtually any shape that will cause them to come to rest on the plate in a manner that forms on the plate surface an open-structure layer that distributes a portion of the fiber away from the surface to provide spaces in the layer that enable particulate material to pass therethrough. A variety of alternate configurations are depicted in FIG. 9 of provisional application No. 62/495,636. Those configurations are incorporated herein by reference.

A number of examples of controlled-debris element configurations that can be used to effect are depicted in FIG. 7. FIG. 7a depicts a controlled-debris element 150 in the shape of a hollow cylindrical with a honeycomb-like interior. The partitions 152 forming the interior honeycomb-like structure and the raised ridges 154 on the element's exterior surface provide sharp edges that assist in capturing fibers in the flow.

Figure 7A:
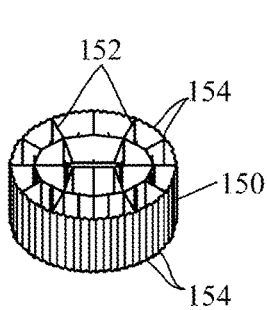
FIGS. 7a to 7g, shows multiple configurations of controlled-debris elements according to the present invention.
Figure 7B:
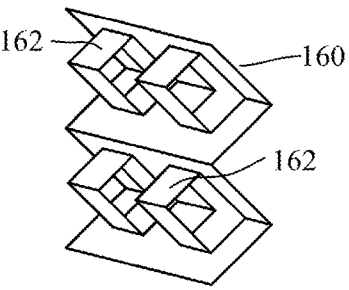
Figure 7C:
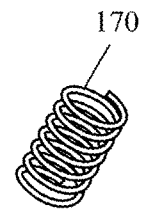
Figure 7D:
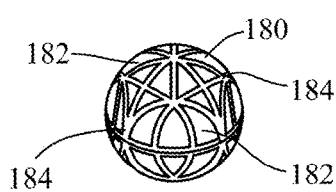
Figure 7E:
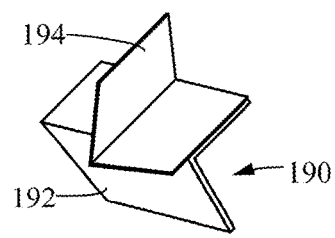

FIG. 7b illustrates a controlled-debris element 160 fabricated from a sheet of stainless steel folded into an accordion shape and having punch-out portions 162. It can come to rest on the perforated plate of a suction strainer in a large number of orientations, but it will be appreciated from the drawing that they all involve an open configuration. FIG. 7c illustrates a controlled-debris element in the shape of a coil spring 170, which will distribute a portion of the fibers in the cooling flow away from the strainer surface to prevent undue blockage of the perforations in the strainer plates. FIG. 7d depicts a spherical controlled-debris element 180 with a surface with depressions 182 separated by lands 184. It will be appreciated that the element 180 will also stack with an open configuration even if the spheres become tightly packed together on the strainer surface. FIG. 7e depicts a controlled-debris element embodiment 190 constructed from a first L-shaped piece 192 with the face of one leg of the L adhered to the face of a leg of a second L-shaped piece 194. It will be appreciated that controlled debris in this configuration can only come to rest on a strainer surface in a manner that provides the open structures that are a salient feature of the controlled-debris elements described herein.

Figure 7F:
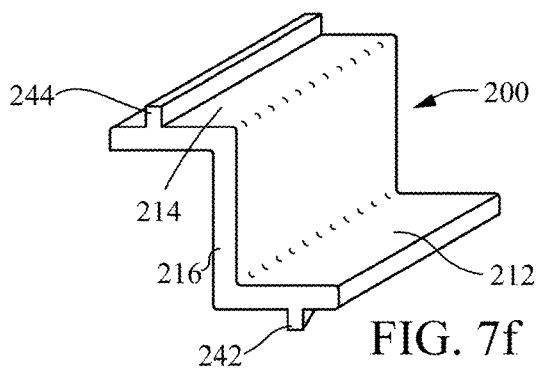
Figure 7G:
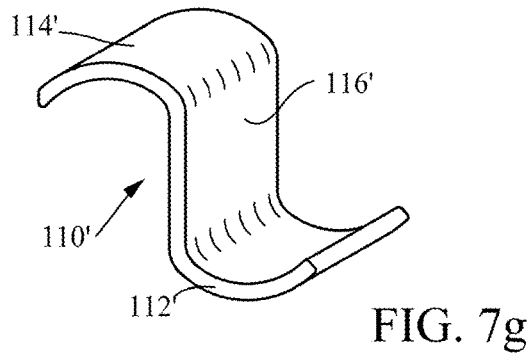

FIG. 7f depicts a Z-shaped element 210 representing a modification of the element 110 described above in connection with FIG. 6. The "200-series" reference numerals in FIG. 7f denote elements that find counterparts in the "100-series" reference numerals in FIG. 6. The controlled-debris element 200 includes protrusions 242 and 244 on the outer surfaces of respective legs 212 and 214. The protrusions prevent the flat outer surfaces of the legs 212 and 214 from coming to rest in surface-to-surface contact with the strainer plates and so that the elements themselves do not block perforations in the strainer. FIG. 7g depicts another variation on the Z-shaped element shown in FIG. 6. Reference numerals in FIG. 7g use a prime (') for features in FIG. 6 with the same base reference numeral. The Z-shaped element 110' comprises two curved legs 112' and 114' connected by a straight connecting leg 116'. The curvature imparted to the legs 112' and 114' also prevents them from coming to rest in surface-to-surface contact with the strainer plates. In another variation the connecting leg can be curved. It will be understood that the term "Z-shaped" as used herein is not limited to the specific shapes depicted in FIGS. 6, 7f, and 7g. For example, the first and second legs can be oriented other than perpendicular to the connecting leg, and need not be parallel to each other. They can also extend beyond the edges where they intersect with the connecting leg, and can include protrusions in addition to those shown is FIG. 7f.

Those skilled in the art will recognize that an aspect of the invention involves providing controlled-debris means for forming on the strainer surface a debris/element layer with open spaces as the cooling water is drawn toward the first side of the plate by the EGGS pump, wherein the controlled-debris means is constructed to be entrained with the fibrous and particulate material in the water drawn toward the first side of the plate and form open spaces in the debris/element layer to permit passage through the layer of debris capable of passing through the perforations. The controlled-debris means is not limited to any particular configuration or construction, and includes all of the specific configurations disclosed herein, as well as all functional equivalents thereof.

Another important feature of the invention is that the controlled-debris elements can assume sizes and shapes that permit them to be used with a wide variety of strainer configurations. For example, if used with a strainer of the type described in the applicant's U.S. Pat. No. 5,759,399, the elements would be designed with a size and shape to fit into the space between the facing disc surfaces 112 and 116. The controlled-debris described herein can also be sized so the individual elements fit within the contoured surfaces of adjacent discs in the applicant's U.S. Pat. No. 7,848,475. Likewise, the elements can be sized to fit within the folded perforated plates of the strainer shown in U.S. Pat. No. 8,663,469, or the perforated compartments of the strainers described in U.S. Pat. No. 7,211,190 and Pub. No. US 2013/0208847.

Figure 8:
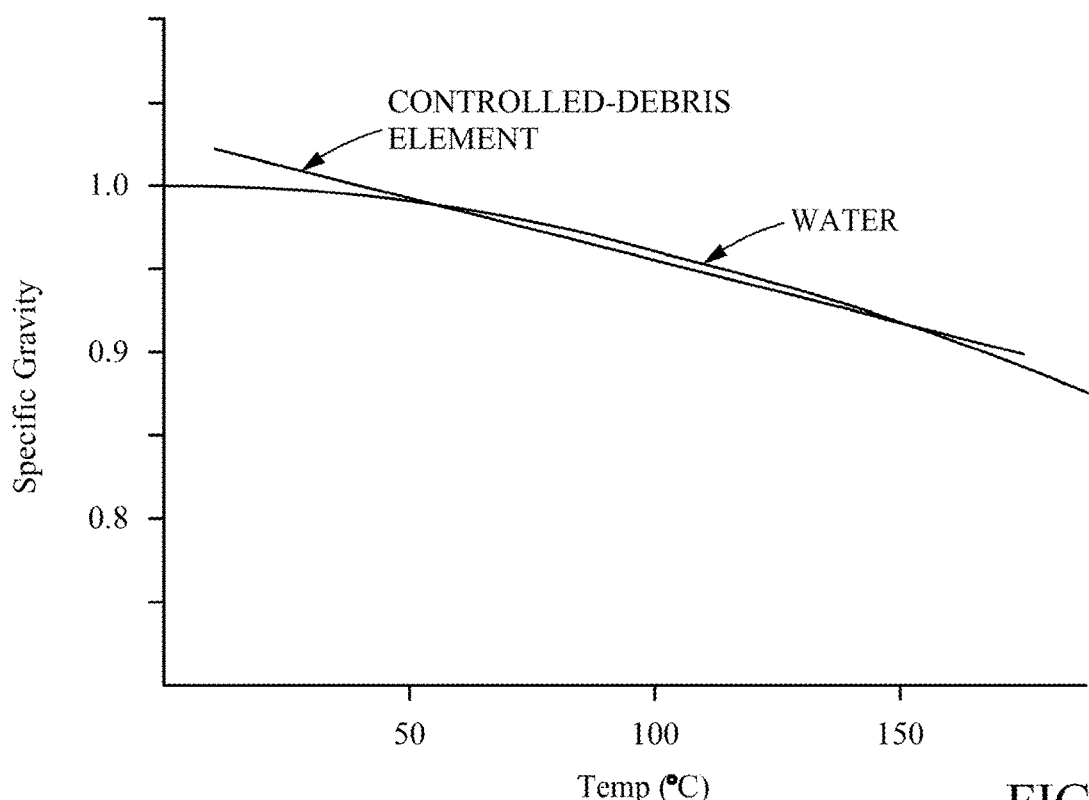
FIG. 8 is a graph of the specific gravities of water and a controlled-debris element vs. temperature according to one particular embodiment of the invention.

To the end of providing the controlled-debris elements with the transport properties that is one of their salient characteristics, the specific gravity of the elements is controlled vis-à-vis that of the cooling water, as illustrated graphically in FIGS. 8 and 9. The curved line in FIG. 8 plots the specific gravity of water against temperature (° C.). The straight line plots the change in specific gravity of a controlled-debris element constructed to have a specific gravity vs. temperature profile that will cause it to be transported toward the strainer with the fibrous debris in the manner described above in connection with FIG. 4. Elements made of a polymer can be manufactured with a desired specific gravity profile by using additives in the polymer as it is formulated. The specific gravity will change in a predictable way as the temperature rises and the material properties are chosen so that its specific gravity will be the same as that of the cooling water at one or more times after LOCA onset, and be substantially the same at other relevant times during a LOCA. In the example in FIG. 8, the controlled debris elements are formulated so that their specific gravity profile substantially matches that of the water at a water temperature reaches about 40° C. (or slightly less as shown in the plot in FIG. 8), soon after LOCA onset, until the water reaches about 170° C. It will be appreciated that the linear specific gravity profile of the controlled-debris element represented in FIG. 8 will not be able to exactly match the nonlinear profile of the cooling water for the duration of a LOCA. However, its profile is "substantially the same" as the cooling water within the meaning of the term as used herein, which is intended to apply to any controlled-debris element with a specific gravity that will facilitate its transport with the cooling water.

FIG. 9 illustrates an embodiment in which the controlled-debris elements will more closely match that of the cooling water as its temperature increases during a LOCA cooling cycle. In this embodiment three different formulations of elements are used, each having a different specific gravity profile. These elements are used in three cohorts, with a first cohort CD1 of one-third of the total number of elements having the specific gravity profile indicated by the solid line in FIG. 9, whereby the specific gravity of the elements is substantially the same as that of the cooling water from about 30° C. to about 80° C. A second cohort CD2 of one-third of the elements can have the specific gravity profile indicated by the dashed line in FIG. 9, whereby the specific gravity of the elements is substantially the same as that of the cooling water up to about 110° C. In this embodiment a third cohort CD3 has the specific gravity profile indicated by the dot-dashed line in FIG. 9. In this way there will be elements in the flow more closely matching the cooling water specific gravity at any given time in a cooling cycle. The controlled-debris elements in each cohort can also be made of different materials with different specific gravity vs. temperature profiles to tailor the transport properties of each cohort to a particular temperature range of the cooling water during a cooling cycle following a LOCA.

Summary. It will be understood that the specific embodiments of controlled-debris elements shown in FIGS. 6 and 7 are meant solely as examples of controlled-debris means for inhibiting the formation of a debris bed comprised primarily of fibrous and particulate material entrained in circulating cooling water in a nuclear power plant as the water is drawn toward a first, pressure side of an ECCS strainer by an ECCS pump through a perforated plate to a second, suction side of the strainer by the first side of the plate. It is intended that such means include any element configuration that performs the stated function and is constructed to be entrained with the fibrous and particulate material in the water drawn toward the first side of the plate. This includes all such configurations disclosed herein and in provisional application No. 62/495,636, and all equivalents of those configurations.

Operational Deployment of Controlled-Debris Elements

It is important to the proper utilization of the controlled-debris elements to transport them to the ECCS strainers as soon as the pumps begin to draw cooling water through the strainers. Various deployment arrangements are described in Bilanin, A. J., et al., "Recapturing Net Positive Suction Head Margins in Boiling Water Reactor Emergency Core Cooling Systems," *Proceedings of the ASME* 2017 *Pressure Vessels & Piping Conference*, Jul. 16-20, 2017, Waikoloa, Hi. ("Bilanin ASME article"), the entire contents of which are incorporated by reference as if set out in full herein.

Figure 10:
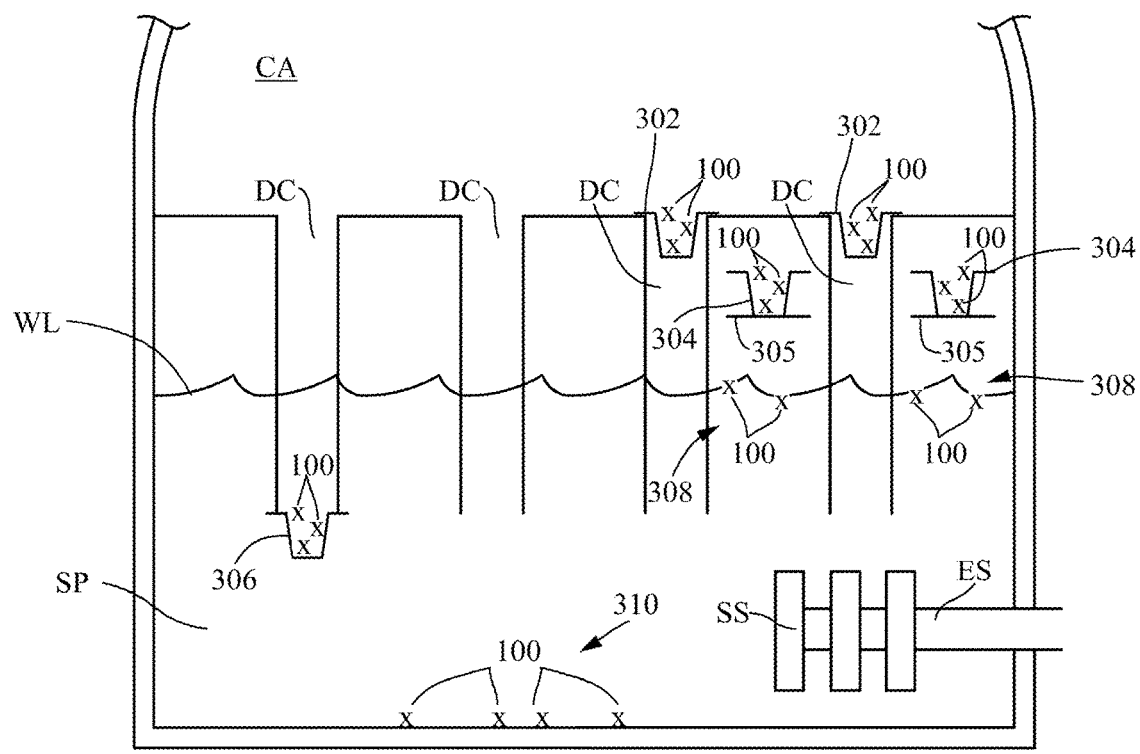
FIG. 10 is a schematic depiction of various ways of storing controlled-debris elements as described herein in a nuclear power plant to enable rapid deployment into the cooling water in response to a LOCA event.

FIG. 10 shows various ways of storing the controlled-debris elements 100 for rapid deployment into the cooling flow in a BWR when needed. One way is to store the elements in basket-like receptacles 302 located at the upper entrances to the downcomers DC. Another uses similar baskets 304 mounted on shelves 305 just above the water level WL in the suppression pool. Another mounts them in similar baskets 306 at the outlets of the downcomers DC in the suppression pool. With these deployment arrangements, a minor accident, such as a small break in a steam pipe insufficient to dislodge insulation would not deploy the elements. However, in the event of a large break LOCA, sufficient flow will occur to disperse the elements. This could be effected by pool swell or by designing the baskets to break away from their mountings under sufficient stress and empty their contents into the suppression pool. Once dispersed, the ECCS pumps transport them with the cooling water to the suction strainers. These deployment arrangements, used separately or in combinations, are advantageous because the controlled-debris elements are never loose in the pool or containment area unless there is a significant LOCA, so the pool remains clear of the controlled debris during routine maintenance, such as pool vacuuming.

An alternate deployment strategy is to employ controlled-debris elements made of a material with a specific gravity that enables them to float in the pool, as indicated by reference numeral 308, at the normal pool operating temperature, which is typically about 26° C. (depending on the time of year). Upon a large break LOCA, the pool temperature quickly rises and the elements will begin to sink and be transported to the suction strainer along with the fibrous insulation fragments. Even though the elements are always present in the suppression pool, they will not disrupt normal plant operations. For example, many plants incorporate a residual heat removal system to maintain the cooling water at a desired temperature during hot weather operation. In the event water is drawn through the strainers by the ECCS pumps in a heat removal cycle, the debris elements 308 will be drawn against the suction strainers and will again float to the surface once the heat removal cycle is completed. The test results reported below indicate that the presence of controlled-debris elements in accordance with the invention has an insubstantial effect on flow through the strainers.

Yet another deployment arrangement uses elements 310 with a specific gravity slightly higher than water so they reside on the bottom of the suppression pool during normal plant operation. When a LOCA occurs, it induces pool swell and condensation events in which the atmosphere in the containment area and the steam are forced into the suppression pool and the steam condensation causes chugging and condensation oscillation for seconds or several minutes. This disturbance of the water in the suppression pool quickly transports the elements off the pool bottom and into the flow of the fiber-laden cooling water toward the strainers.

The amount of controlled debris required is determined by estimating how much is needed to cover all perforated plate surfaces on all suction strainers in a particular plant with a layer corresponding to the thickness of two stacked elements—about 30 mm. A BWR typically has a strainer area of about 93 square meters, so the total volume occupied by the elements is roughly 2.8 cubic meters. If the packing density of the elements is assumed to be 10% with a specific gravity of 1.0, the total mass of the controlled elements will be in the range of 272 kg. This is a small fraction of the total mass of over 3.6 million kg of the cooling water in the suppression pool.

It will be understood by those skilled in the art that other deployment arrangements would typically be used in a PWR, in which the containment area is dry until the occurrence of a LOCA. For example, in a PWR, the controlled debris could be distributed in the dry containment area sump in close proximity to the strainers, where they would be quickly drawn onto the strainer surfaces when the sump is flooded and the ECCS pumps begin drawing cooling water through the strainers.

Working Example

The inventors used the test apparatus described in provisional application No. 62/495,636 and the Bilanin ASME article to verify the advantageous results achieved using controlled-debris elements in accordance with the description herein. The description in provisional application No. 62/495,636 and the Bilanin ASME article of the test apparatus, the tests performed with it, and the test results are incorporated by reference as if set out in full herein. The below working examples summarize some of the significant findings and conclusions from those tests.

Figure 12:
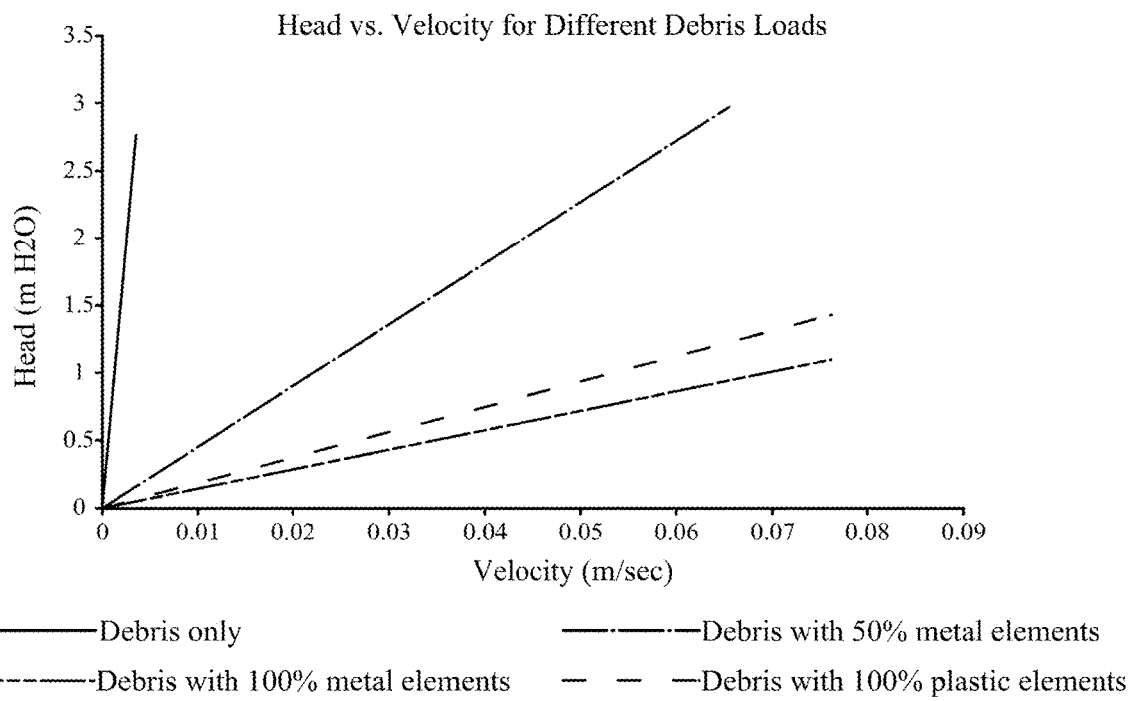
FIG. 12 plots the results of tests comparing pressure head loss across a perforated plate with and without the use controlled-debris elements as described herein.
Figure 11:
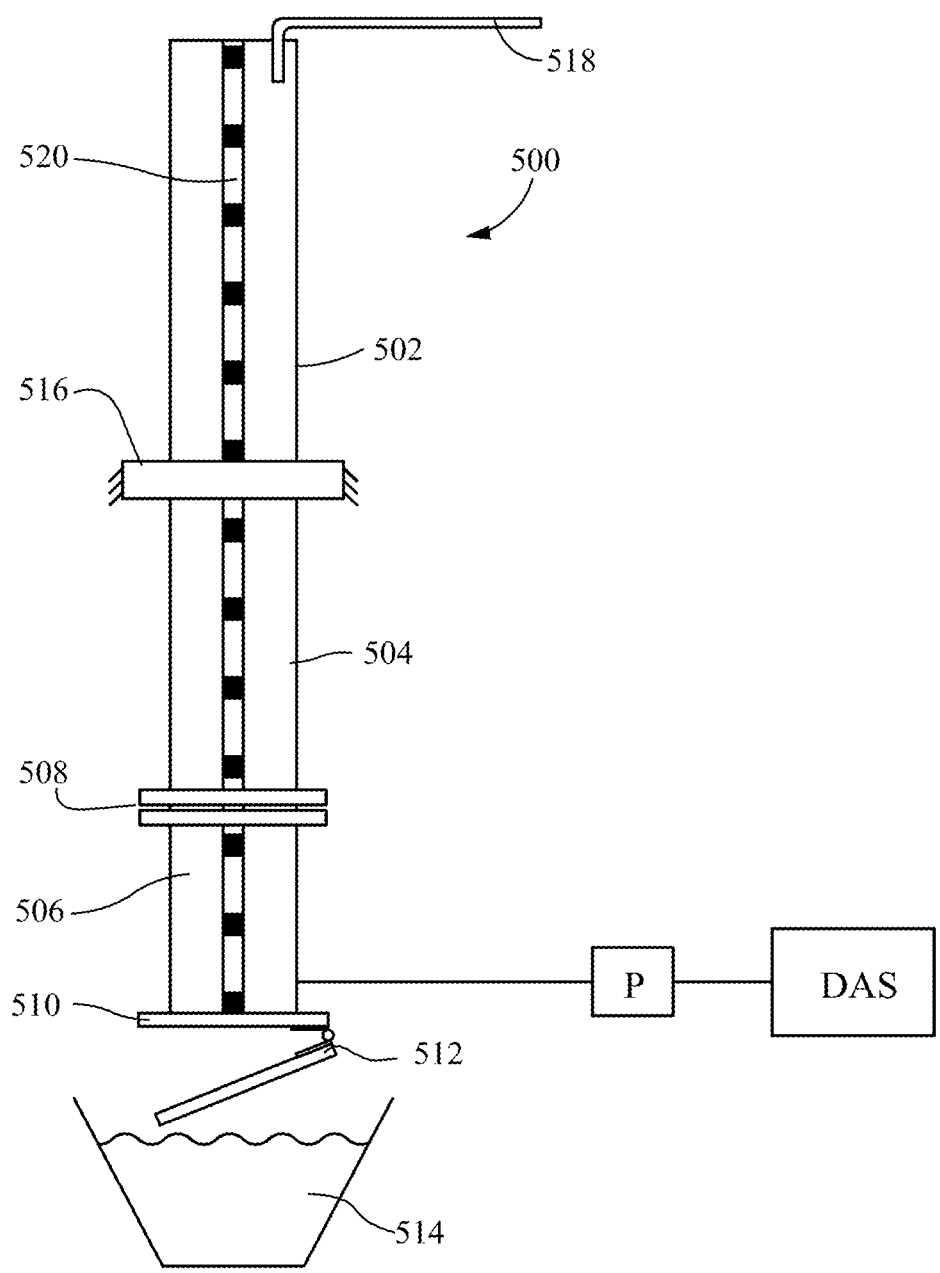
FIG. 11 illustrates a test apparatus used to perform tests simulating flow through a perforated plate of a suction strainer in a nuclear power plant in order to study the effects of using controlled-debris elements as disclosed herein.

FIG. 11 is a schematic depiction of the test apparatus used to generate the test results presented below and illustrated graphically in FIG. 12. The apparatus 500 is a clear tube 502 about 15 cm in diameter with an upper portion 504 and a lower portion 506 sealed together by a bolted flanged connection 508. Unbolting the flanges permits the upper and lower portions to be separated to provide access from the inside of the tube to a perforated plate 510 at the bottom of the tube 502. The tube is about 4.5 meters high measured from the perforated plate. A sealing plate 512 is hinged to the perforated plate 510 to seal the bottom of the tube when the plate is in a closed position (not shown) and to permit the contents of the tube to empty through the perforated plate 510 into a receptacle 514 when the sealing plate 512 is in the open position shown in FIG. 11. A bracket 516 mounts the tube to supporting structure. A pipe 518 supplies water to the top of the tube, and a measuring scale 520 indicates the pressure head in meters above the perforated plate. A pressure transducer (not shown) disposed in the tube just above the perforated plate is connected by an electrical lead to a converter P that provides a signal to a data acquisition system DAS. The data acquisition system records the pressure p measured by the transducer as a function of time t.

Tests are performed on a debris mix transported to the strainer perforated plate surface on the bottom of the rig by first introducing the test mixture into the top of the tube after it has been filled with water. The sealing plate 512 is opened and the debris mix is entrained in the water as it flows through the perforated plate 510. As the water discharges, a bed of the debris forms on the perforated plate that simulates the debris bed formed on suction strainer surfaces in a power plant ECCS. Next, the sealing plate 512 is closed, and the tube is carefully refilled with water to avoid disturbing the bed. Once the tube is refilled, the sealing plate is reopened and the pressure transducer just above the perforated plate senses the pressure above the perforated plate and the data acquisition system records the pressure p as a function of time t as the water drains from the tube 502.

The velocity through the debris bed on the plate can thus be derived using the measured pressure as a function of time. Starting with the relationship $$p(t) = \rho \times g \times h(t) \quad (1)$$

and differentiating equation (1) with respect to time, the pressure change with time is expressed as a function of the water flow velocity as follows:

$$dp/dt = \rho \times g \times dh/dt \quad (2)$$

where $\rho$=density of water, g=acceleration of gravity, h=height of water above the bed, and dh/dt is the velocity of the water approaching the debris bed. Plotting p(t) versus dh/dt gives the pressure drop through the debris bed as a function of the flow velocity of the water approaching the bed. This can be fit to a quadratic function of velocity of the form:

$$h(t) = a \times dh/dt + b \times (dh/dt)^2 \quad (3)$$

The ECCS flow rate, and therefore the approach velocity, are known for any particular power plant. Using that velocity in equation (3), the head loss across the debris bed can be estimated. If the head loss is less than the net positive suction head loss required to operate the ECCS pumps for that plant, its ECCS system will operate per specification for the tested debris load.

The Bilanin ASME article describes tests that demonstrate the effect on suction strainer flow caused by fiber/particulate beds discussed above in connection with FIG. 2 above. Those tests, the results of which are tabulated in Table 1 of the article, yielded a head loss through a fiber/particulate bed approximately 40 times higher than the head loss through a debris bed comprising just fibrous material taken from Performance Contracting, Inc., Nukon® insulation at a velocity of 1 m/sec. This is clear empirical evidence of the need for an effective way of alleviating the flow restriction caused by the release of fibrous material and particulates in a nuclear power plant LOCA. The following working example illustrates how the controlled-debris elements described herein alleviate the flow inhibiting effects of fibrous/particulate beds on ECCS suction strainers.

A first set of tests with the test apparatus 500 shown in FIG. 11 was run according to the test protocol discussed above to determine the flow characteristics of various debris beds on the perforated plate 510 of the apparatus 500. The first test was run using a mix of typical fibrous and particulate materials. A plot of flow velocity (meters/sec) vs. the pressure head (meters) in the tube 502 is shown by the solid line in FIG. 12. This shows the severe flow restriction caused by a mixed fibrous/particulate filtration bed.

In another test the debris bed comprised controlled-debris elements alone. These elements were stainless steel sheet 0.25 mm thick and formed into a Z-shape similar to the element 110 shown in FIG. 6. There was virtually no pressure head loss across the perforated plate head loss over a range of up to three meters of water in the tube. This established that controlled-debris elements according to the present disclosure provide little or no flow resistance. The plot of flow velocity vs. pressure head is omitted from FIG. 12 because it was virtually indistinguishable from the x-axis.

Another series of test was run by introducing the fibrous material, the particulate material, and a predetermined amount by volume of the controlled-debris elements. This was designated as a "100% amount," and the flow velocity through the fiber/particulate/controlled-element bed on the plate is plotted by the dash-two-dot line in FIG. 12. This plot shows the advantageous effect on flow velocity with the 100% amount of controlled-debris elements. For example, at a pressure head of 1.0 meters, the flow velocity through the bed with the 100% amount of controlled-debris elements is about 0.066 m/sec, as compared to about 0.0015 m/sec for the debris bed with no controlled debris elements (the solid line in FIG. 12). In other words, the flow rate was increased over 40-fold by entraining the 100% amount of controlled-debris elements in the flow as the debris bed is being formed.

A second test was run with half of the amount of the same metal controlled-debris elements but otherwise under conditions identical to those in the 100% amount test. This test is plotted by the dash-one-dot 50% line in FIG. 12. It illustrates the alleviation of the flow restriction on the fibrous/particulate bed to a lesser extent than the 100% bed. These tests demonstrate that the sensitivity of pressure head loss to the quantity of controlled debris is small, and that a significant reduction in head loss is still achieved even if half of the controlled-debris elements released into the cooling water are not deposited on the strainer surfaces. These tests results taken together also appear to substantiate the inventors' belief as to the mechanisms underlying the effect achieved by entraining controlled debris elements according to the disclosure herein, as discussed above in connection with FIGS. 4 and 5.

A third set of tests was run under the same conditions using the plastic controlled-debris elements shown in FIG. 6.

The volume of elements was similar to the volume of metal elements in the 100% amount tests. The results are plotted in FIG. 12 by the dash-two-dot line. This test illustrates that the plastic debris has similar head loss performance as the metal Z-shaped elements. The plastic elements can have substantially the same specific gravity as water and therefore will be more readily transported with the entrained fibers and particulates. Metal elements will typically have a much higher specific gravity which will somewhat impair their ability to be transported in the cooling water. However, metal elements may have application in PWRs where the controlled-debris elements might be deployed above strainers in dry sumps.

The tests presented here illustrate the severe flow restriction through ECCS strainers caused by the accumulation of a debris bed that includes particulate matter in addition to fibrous material released into the reactor cooling water by a LOCA event. They also show that entraining controlled-debris elements with the characteristics described herein in the cooling flow substantially alleviates the decrease in net positive suction head (NPSH) across a strainer by fibrous/particulate debris beds forming thereon. They also indicate that the number of controlled-debris elements introduced into the flow will generally not affect the degree to which they alleviate reduction in NPSH by an amount that is operationally significant. They also demonstrate that the presence of the elements in a BWR suppression pool during normal plant operation will not affect the residual heat removal system that maintains the cooling water at a desired temperature during hot weather operation. And they show that the effectiveness of the elements is largely independent of the material from which they are made.

SUMMARY

The applicant believes that this disclosure presents a solution to the problem of the formation of filtration beds on ECCS suction strainers in nuclear power plants during a LOCA. The test results presented herein shown that the addition of engineered debris, such as the controlled-debris elements disclosed herein or equivalents thereof, to a power plant containment system to enhance the operation of ECCS suction strainers is viable and achievable. The invention in its various applications and embodiments inhibits the formation of a dense fiber/particulate bed from on the strainer to reduce the likelihood that the strainer will become in effect a particulate filter. The applicant believes that the techniques described herein can be implemented in existing and future nuclear power plants via current regulatory procedures, and may simplify other industry activities directed to the same end, such as replacing fibrous insulation with non-fibrous alternatives and using PRA analyses.

While certain salient features of the invention have been described as particularly useful in connection with ECCS strainers in a nuclear power plant, the invention itself is not so limited. For example, the controlled-debris elements described herein can be used with strainer constructions other than ones comprised of perforated plates typically used in ECCS strainers. In addition, the controlled-debris elements described herein are applicable to any environment in which fibrous material is entrained in a liquid drawn through a strainer. Examples of other such environments are the intakes from rivers and bays that provide the heat rejection from power plants or any industrial process that uses cooling water drawn from a supply that is contaminated with fibrous and particulate debris.

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. An emergency core cooling system in a nuclear power plant for circulating cooling water during a time period beginning near the onset of a power plant loss of cooling accident (LOCA) producing debris including fibrous material and debris particles entrained in the cooling water during the LOCA, wherein the LOCA causes the temperature of the cooling water to increase from its temperature during normal power plant operation prior to the LOCA onset, the cooling system comprising:

a strainer disposed in the emergency core cooling system at a location where it will be immersed in a reservoir of the cooling water during the LOCA, said strainer having a surface for retaining debris in the cooling water reservoir and perforations through the surface for permitting the cooling water to pass through the strainer;

a pump disposed on a suction side of the strainer surface and operable during the LOCA to provide a pressure drop relative to a pressure side of the strainer surface opposite the suction side for causing the cooling water in the reservoir to flow toward the pressure side of the strainer surface, wherein the perforations are sized to inhibit passage of entrained fibrous material larger than the perforations and to allow passage of entrained debris particles smaller than the perforations; and a plurality of controlled-debris elements disposed in the emergency core cooling system for entrainment in the flow toward the strainer of cooling water in the reservoir during the LOCA, wherein:

each element is constructed with a specific gravity vs. temperature profile so that the element has a specific gravity substantially the same as the cooling water when the cooling water reaches a predetermined increased temperature above its temperature during normal power plant operation after the LOCA onset for entraining the element in the flow of cooling water toward the strainer and depositing on the pressure side of the strainer surface a debris/element layer comprising a plurality of the elements and the debris; and the elements are configured to inhibit the deposit of fibrous material directly on the strainer suction surface and form open spaces between adjacent elements in the debris/element layer that allow passage of entrained debris particles through the debris/element layer and the strainer perforations to alleviate pressure head loss across the debris/element layer on the strainer during the LOCA.

2. An emergency core cooling system as in claim 1, wherein the controlled-debris elements comprise multiple separate pieces permanently secured together.

3. An emergency core cooling system as in claim 2, wherein the separate pieces have different specific gravities.

4. An emergency core cooling system as in claim 1, wherein each element is made from plastic and comprises a single integral piece.

5. An emergency core cooling system as in claim 1, wherein each element has at least one edge for enhancing the ability of the element to capture in the debris/element layer fibrous material entrained in the cooling water.

6. An emergency core cooling system as in claim 1, wherein:
the strainer includes a plurality of strainer elements each having a pressure side and a suction side disposed in the emergency core cooling system with the pressure sides of adjacent pressure surfaces of respective strainer elements in facing relation with a predetermined distance between said facing pressure surfaces; and
the largest dimension of each controlled-debris element is smaller than the predetermined distance.

7. An emergency core cooling system as in claim 1, wherein each controlled-debris element comprises a single piece extruded from a polymer and cut into a desired length.

8. An emergency core cooling system as in claim 1, wherein the controlled-debris elements are selected from the group consisting essentially of at least one of:
a Z-shaped single piece extruded from a polymer and cut into a desired length,
a Z-shaped single piece made of sheet metal,
a one-piece hollow polymer cylinder with an interior honeycomb-like structure,
a metal sheet formed onto an accordion shape and having punch-out portions,
a metal or polymer coil spring,
a polymer sphere with surface depressions separated by lands,
first and second L-shaped elements having a surface of one element permanently adhered to a surface of the other element,
a Z-shaped element single piece having protrusions on two legs of the Z and being extruded from a polymer and cut into a desired length, and
a Z-shaped single piece with two curved legs extruded from a polymer and cut into a desired length.

9. An emergency core cooling system as in claim 1, wherein at least some of the elements have a specific gravity less than the specific gravity of the cooling water at the temperature thereof during normal power plant operation for causing said elements to float on the surface of the cooling water in a suppression pool of the nuclear power plant that holds the cooling water during normal power plant operation and comprises the reservoir of cooling water during the LOCA.

10. An emergency core cooling system as in claim 9, wherein each controlled-debris element is made from plastic and comprises a single integral piece.

11. An emergency core cooling system as in claim 9, wherein each element has at least one edge for enhancing the ability of the element to capture in the debris/element layer fibrous material entrained in the cooling water.

12. An emergency core cooling system as in claim 1, further comprising a plurality of receptacles, each receptacle holding a predetermined plurality of the elements to be released at the LOCA onset into a suppression pool of the nuclear power plant that holds the cooling water during normal operation of the nuclear power plant and comprises the reservoir of cooling water during the LOCA.

13. An emergency core cooling system as in claim 12, wherein each element is made from plastic and comprises a single integral piece.

14. An emergency core cooling system as in claim 12, wherein each element has at least one edge for enhancing the ability of the element to capture in the debris/element layer fibrous material entrained in the cooling water.

15. An emergency core cooling system as in claim 1, further comprising a dry sump that is flooded with water at the LOCA onset to create the reservoir of cooling water circulated during the LOCA, wherein the elements are disposed in the dry sump during operation of the nuclear power plant.

16. An emergency core cooling system as in claim 15, wherein each element is made from plastic and comprises a single integral piece.

17. An emergency core cooling system as in claim 15, wherein each element has at least one edge for enhancing the ability of the element to capture in the debris/element layer fibrous material entrained in the cooling water.

18. An emergency core cooling system as in claim 1, wherein at least some of the elements have a specific gravity greater than the specific gravity of the cooling water at the temperature thereof during normal power plant operation for causing said elements to rest on the bottom of the cooling water in a suppression pool of the nuclear power plant that holds the cooling water during normal power plant operation and comprises the reservoir of cooling water during the LOCA.

19. An emergency core cooling system as in claim 1, wherein the plurality of elements comprises the number of elements required to cover all of the perforated surfaces of the strainers with a layer of two stacked elements.

20. An emergency core cooling system as in claim 1, wherein the elements are configured to form open structures on the strainer surfaces for distributing the fibrous material away from the surface and maintaining cavities between the elements in the debris/element layer.

21. An emergency core cooling system as in claim 1, wherein each element has at least one sharp edge for enhancing the ability of the element to capture in the debris/element layer fibrous material entrained in the circulating cooling water.

22. An emergency core cooling system as in claim 1, wherein the elements are configured to permit substantially unobstructed flow through the strainer perforations in the absence of debris in the cooling water.

23. An emergency core cooling system in a nuclear power plant for cooling water during a time period beginning near the onset of a power plant loss of cooling accident (LOCA), the cooling system comprising:
a strainer disposed in the emergency core cooling system at a location where it will be immersed in a reservoir of the cooling water during the LOCA and having a surface for retaining debris in the circulating water and perforations through the surface for permitting the circulating water to pass through the strainer;
a pump for drawing the cooling water through the perforations, the pump being disposed on a suction side of the strainer surface to provide a pressure drop relative to a pressure side of the strainer surface opposite the suction side; and
a plurality of controlled-debris elements disposed in the emergency core cooling system for entrainment into the cooling water on the pressure side of the surface, wherein:
each element has a specific gravity substantially the same as the circulating water at a predetermined temperature of the cooling water following the LOCA onset for entraining the element in the flow of water in the reservoir toward the strainer and depositing on the strainer surface a debris/element layer comprising a plurality of the elements and the debris;
the elements are configured to form open spaces between adjacent elements in the debris/element layer;
the plurality of elements comprises at least first and second cohorts each including a plurality of elements, the first cohort including a plurality of a first kind of element having a first specific gravity vs. temperature profile and the second cohort including a plurality of a second kind of element having a second specific gravity vs. temperature profile different from the first specific gravity vs. temperature profile; and each kind of element has a specific gravity substantially the same as the specific gravity of the cooling water at a different temperature following the LOCA onset.

24. An emergency core cooling system as in claim 23, wherein the first and second kinds of elements have the same configuration.

25. An emergency core cooling system as in claim 24, wherein each controlled-debris element comprises a Z-shaped single piece extruded from a polymer and cut into a desired length.

26. An emergency core cooling system as in claim 24, wherein each element has at least one edge for enhancing the ability of the element to capture in the debris/element layer fibrous material entrained in the cooling water.

* * * * *